(12) United States Patent
Hatasaki

(10) Patent No.: US 7,500,234 B2
(45) Date of Patent: Mar. 3, 2009

(54) SYSTEM-UPDATING METHOD AND COMPUTER SYSTEM ADOPTING THE METHOD

(75) Inventor: Keisuke Hatasaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 495 days.

(21) Appl. No.: 10/790,200

(22) Filed: Mar. 2, 2004

(65) Prior Publication Data

US 2005/0071838 A1    Mar. 31, 2005

(30) Foreign Application Priority Data

Sep. 30, 2003  (JP) ............................. 2003-339487

(51) Int. Cl.
*G06F 9/44* (2006.01)
(52) U.S. Cl. .................. 717/168; 717/169; 717/170; 717/171; 717/172; 717/173
(58) Field of Classification Search .......... 717/168–178
See application file for complete search history.

(56) References Cited

U.S. PATENT DOCUMENTS

| | | | | |
|---|---|---|---|---|
| 6,199,204 | B1 * | 3/2001 | Donohue | 717/178 |
| 6,202,207 | B1 * | 3/2001 | Donohue | 717/173 |
| 6,324,690 | B1 * | 11/2001 | Luu | 717/173 |
| 6,487,718 | B1 * | 11/2002 | Rodriguez et al. | 717/177 |
| 6,681,390 | B2 * | 1/2004 | Fiske | 717/173 |
| 6,751,794 | B1 * | 6/2004 | McCaleb et al. | 717/168 |
| 6,986,133 | B2 * | 1/2006 | O'Brien et al. | 717/173 |
| 7,000,231 | B1 * | 2/2006 | Gold | 717/174 |
| 7,080,371 | B1 * | 7/2006 | Arnaiz et al. | 717/170 |
| 7,191,435 | B2 * | 3/2007 | Lau et al. | 717/168 |

2004/0181787 A1 *  9/2004  Wickham et al. ........... 717/168

FOREIGN PATENT DOCUMENTS

JP        03-206529        9/1991

(Continued)

OTHER PUBLICATIONS

Hicks, et al. "Dynamic Software Updating", 2001, ACM, p. 13-23.*

(Continued)

*Primary Examiner*—Wei Y Zhen
*Assistant Examiner*—Qamrun Nahar
(74) *Attorney, Agent, or Firm*—Mattingly, Stanger, Malur & Brundidge, P.C.

(57) ABSTRACT

A vendor system acquires information from the user system regarding hardware used in the user system and software installed in the user system. The vendor system constructs a test environment based on the information. Subsequently, the vendor system examines operations of the user system updated by a software-updating patch in the test environment to determine whether the user system operates normally in the test environment. If normal operations are verified, the vendor system transmits the software-updating patch to the user system. The user system applies the software-updating patch to the software installed in the user system to update the user system. As a result, the user system can be easily updated by updating the software installed in the user computer through a network. In addition, after the software is updated, high reliability and high service level of the user system can be achieved.

9 Claims, 11 Drawing Sheets

FOREIGN PATENT DOCUMENTS

| | | |
|---|---|---|
| JP | 04-195436 | 7/1992 |
| JP | 04-373037 | 12/1992 |
| JP | 06-110678 | 4/1994 |
| JP | 06-113851 | 4/1994 |
| JP | 200255839 | 2/2002 |
| JP | 2003-141011 | 5/2003 |
| JP | 2003-005977 | 10/2003 |

OTHER PUBLICATIONS

Masahiro Kusakari, Youji Shirotani, "A feature article: Soralis Troubleshooting, protections and emergency measures for troubles", UNIX Magazine, Japan, Co. ASCII, Jan. 1, 2003, vol. 18, No. 1, p. 33, 37 (with English translation).

Jun Murai, Shin Yoshimura editorial, "Internet Operation - principles and practice-", Japan, Co. Kyoritsu Publishing, May 5, 1999, the first edition, p. 114 (with English translation).

* cited by examiner

SYSTEM-UPDATING METHOD AND COMPUTER SYSTEM ADOPTING THE METHOD

FIELD OF THE INVENTION

The present invention relates to a system-updating method and a computer system adopting the method. More particularly, the present invention relates to a system-updating method, which is suitable for an application to an open system allowing software of a user system to be updated very frequently, allows the work to update the software of the user system to be carried out with ease and is capable of assuring the high reliability and service level of the user system after the software-updating work, as well as relates to a computer system adopting the method.

BACKGROUND OF THE INVENTION

Most conventional methods to update a computer system of the user are a method of installing software from a recording medium such as a CD-ROM. The computer system of the user is referred to hereafter simply as a user system.

In recent years, however, there is adopted a method of downloading software from a vendor computer system providing software by way of a network and installing the downloaded software in a user system. The vendor computer system is referred to hereafter simply as a vendor system.

In accordance with this method of installing software in a user system through a network, typically, in the user-system information on the configuration of software used in the user system is generated, and the user system periodically receives information on software updates from a patch management server of the vendor system byway of the network. Then, the user system compares the generated information on the configuration of software used in the user system with the received information on software updates in order to examine the configuration for pieces of software that need to be updated. The user system then displays a list extracted from a result of the examination as a list of pieces of software to be updated. The user can select a piece of software from the displayed list and request the vendor system to update the selected piece of software. At such a request, the vendor system transmits an software-updating patch for the selected piece of software to the user system by way of the network. Then, the user system applies the software-updating patch to the selected piece of software in order to update the software. The patch herein is a difference file used for correcting a program of the software to be updated.

For example, Japanese Patent Laid-open No. 2002-55839 discloses a typical method whereby a patch database is constructed on the server side and a client receives patch information by way of a network from the server side and applies the patch to a computer system of the client.

In addition, there is also a method of updating software without degrading the availability of the software or the user system. In accordance with this method, in order to update a user system of a critical mission, a person in charge of system management on the vendor side takes a software-updating patch to the user system, applying the patch to a piece of software to be updated while the user system is operating. By updating the piece of software without restarting the user system and the software, the availability of the user system and the software can be prevented from deteriorating.

Furthermore, there is also a method, by which a vendor constructing a user system prepares a system identical with the user system on the vendor side so that an updated user system can be tested on the vendor side.

A technique to update software of a user system through a network is easy to implement in comparison with a technique to update software of a user system by using a recording medium. In addition, the technique to update software of a user system through a network has a merit of allowing most recent software to be used.

By adoption of the conventional technique to update software of a user system through a network, however, it is quite within the bounds of possibility that there is raised a problem of a lower availability following the operation to update the software. The lower availability is caused by a failure occurring in the user system, the operation of which was changed by the operation to update the software. The failure occurring in the user system causes the user system to be halted or restarted, in turn giving rise to the lower availability. As a result of the operation to update the software, it is also quite within the bounds of possibility that there are raised a problem of an inability to reach a service level requested of the user system and a problem that the user can no longer carry out a desired function because of the operation to update the software.

In particular, when it is desired to update a piece of software due to a serious reason such as a detected fragility in security or a found bug, it is quite within the bounds of possibility that the problems described above cause a big damage. In addition, in the case of a system that must operate 365 days a year and 24 hours a day, the software of the system has to be updateable with a high degree of reliability.

Further, it is quite within the bounds of possibility that a peculiar software patch made by the vendor does not necessarily operate correctly for the configuration of a user system. In particular, in the case of a user system executing software of an open source or the like, it is quite within the bounds of possibility that the user itself changes the source code of the software. It is therefore quite within the bounds of possibility that the user system has a configuration unique to the user. As a result, in many cases, a peculiar software patch created by the vendor is not applicable to the user system.

It is thus an object of the present invention addressing the problems described above to provide a system-updating method for updating software of a user system through a network as a method, which allows work to update the software to be carried out in the user system with ease and is capable of assuring the high reliability and service level of the user system after the software is updated.

SUMMARY OF THE INVENTION

In order to solve the problems described above, the present invention provides a system-updating method wherein a vendor system acquires information on a user system as information including information on software installed in the user system and information on hardware of the user system. Then the vendor system constructs a test environment based on the information on the user system. The test environment is used as an environment for verifying the operation of a system to which a software-updating patch has been applied to simulate the user system with the software thereof updated. That is to say, in the test environment, the normal operation of the user system is verified. If the normal operation is verified, the software-updating patch is transmitted to the user system, in which the patch is applied to the software thereof to update the system.

In addition, a test environment can also be constructed on the user-system side so as to provide a mechanism for receiving optimum software-updating patches from the vendor-system side.

By constructing such a test environment identical with the environment of the user system, it is possible to provide the user with only software-updating patches for which the operation of the user system has been verified in the test environment. It is thus possible to get rid of troubles caused by software-updating patches applied to software of the user system.

That is to say, the software-updating patches used for updating the user system have each successfully passed a verification test conducted in the test environment, which is identical with the environment of the user system. Thus, by applying the software-updating patches to the software of the user system, the user system can be updated with a high degree of reliability without causing a system crash at the time the user system is updated. In addition, since post-updating functions and post-updating performances can also be tested as well, a service level requested by the user can be achieved in a reliable manner, and necessary functions can be added with a high degree of reliability.

In addition, the test environment equivalent to the environment of the user system is constructed on the basis of the information obtained by the vendor as information on the user system to be used as an environment for conducting a verification test. Thus, even if the user installs open-source software for an application and changes the software by itself so that a problem caused by an environment unique to the user may be raised, a software-updating patch fitting the user system can be created. As a result, it is also possible to cope with problems peculiar to such a user system.

By adoption of the means described above, the present invention is capable of providing a system-updating method for updating software of a user system through a network as a method, which allows work to update the software to be carried out in the user system with ease and is capable of assuring the high reliability and service level of the user system after the software is updated.

DETAILED PREFERRED OF THE PREFERRED EMBODIMENTS

Embodiments of the present invention will be described with reference to FIGS. 1 to 16.

First Embodiment

A first embodiment of the present invention is explained by referring to FIGS. 1 to 15 below.

Figure 1:
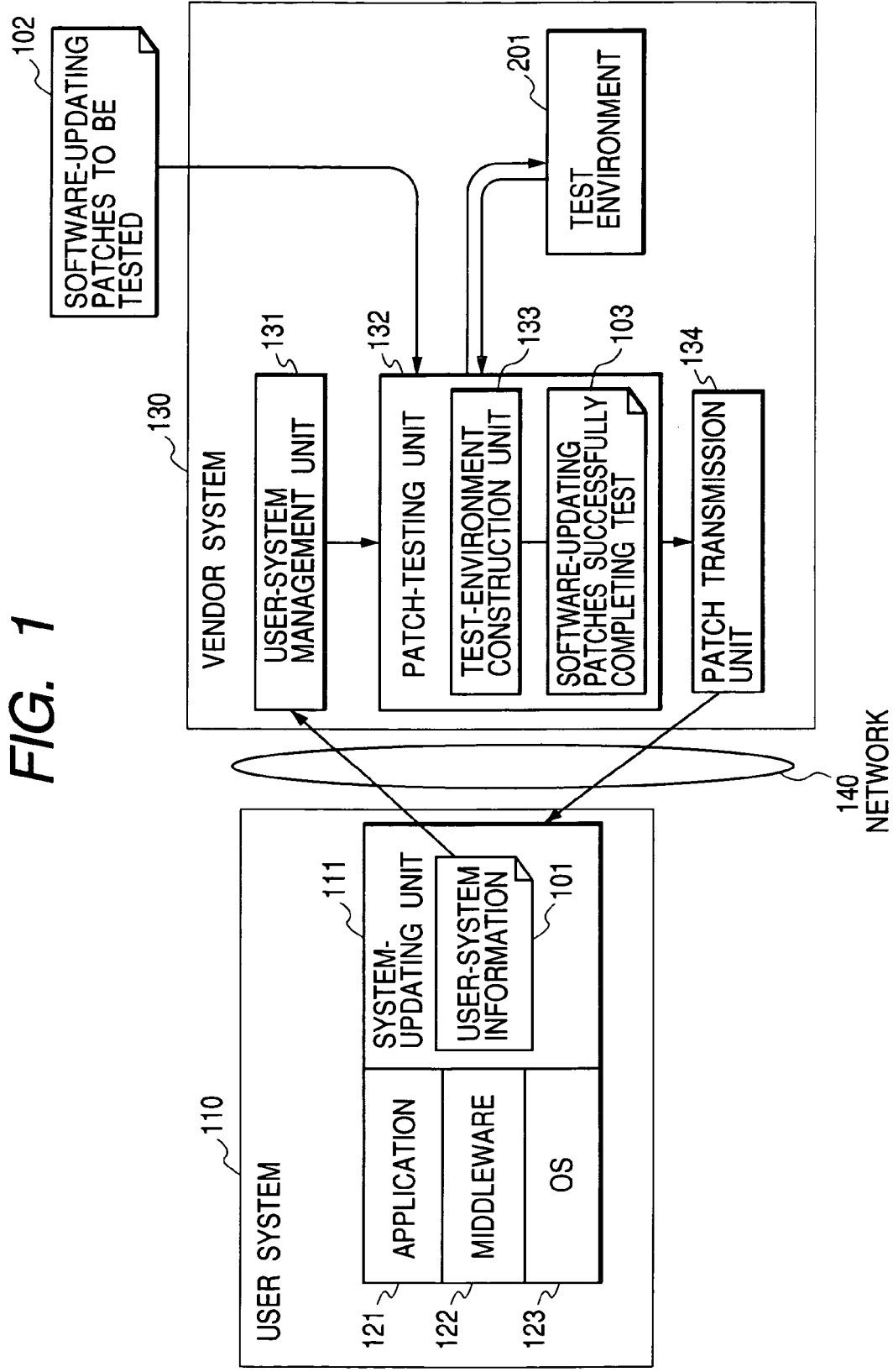
FIG. 1 is a diagram showing the configuration of a system for implementing a system-updating method according to a first embodiment of the present invention.

The description begins with an explanation of the configuration of a system for implementing a system-updating method according to the first embodiment of the present invention with reference to FIG. 1.

FIG. 1 is a diagram showing the configuration of the system for implementing the system-updating method according to the first embodiment of the present invention.

The system for implementing the system-updating method of the first embodiment is a computer system comprising a user system 110 and a vendor system 130, which are connected to each other by a network 140 as shown in FIG. 1. The user system 110 is a system utilized by the user to execute programs. On the other hand, the vendor system 130 is a system for providing software to the user.

The user system 110 is a system comprising an application 121, middleware 122, an OS 123 and a system-updating unit 111.

The system-updating unit 111 has a function to gather user-system information 101 of the user system 110 and transmit the user-system information 101 to the vendor system 130 by using a remote-communication means such as the network 140. The system-updating unit 111 also has a function to update the other components, i.e., the application 121, the middleware 122 and the OS 123.

The OS 123 includes pieces of software embedded in the user system 110. The pieces of software embedded in the user system 110 comprise libraries, device drivers and other modules.

On the other hand, the vendor system 130 is a system comprising a user-system management unit 131, a patch-testing unit 132, a patch transmission unit 134 and a test environment 201.

The patch-testing unit 132 includes a test-environment construction unit 133. The patch-testing unit 132 has a function to fetch a software-updating patch 102, which may need to be corrected, construct a test environment 201 identical with the environment of the user system 110 comprising software to be updated and verify the operation of the user system in the test environment 201. The patch-testing unit 132 corrects the software-updating patch 102 so that a test to verify the operation of the user system ends successfully. Finally, the patch-testing unit 132 generates a corrected software-updating patch 103.

The patch transmission unit 134 transmits the software-updating patch 103 to the user system 110 by way of the network 140.

The following description explains the procedure of the system-updating method according to the first embodiment of the present invention with reference to FIGS. 2 to 7.

Figure 2:
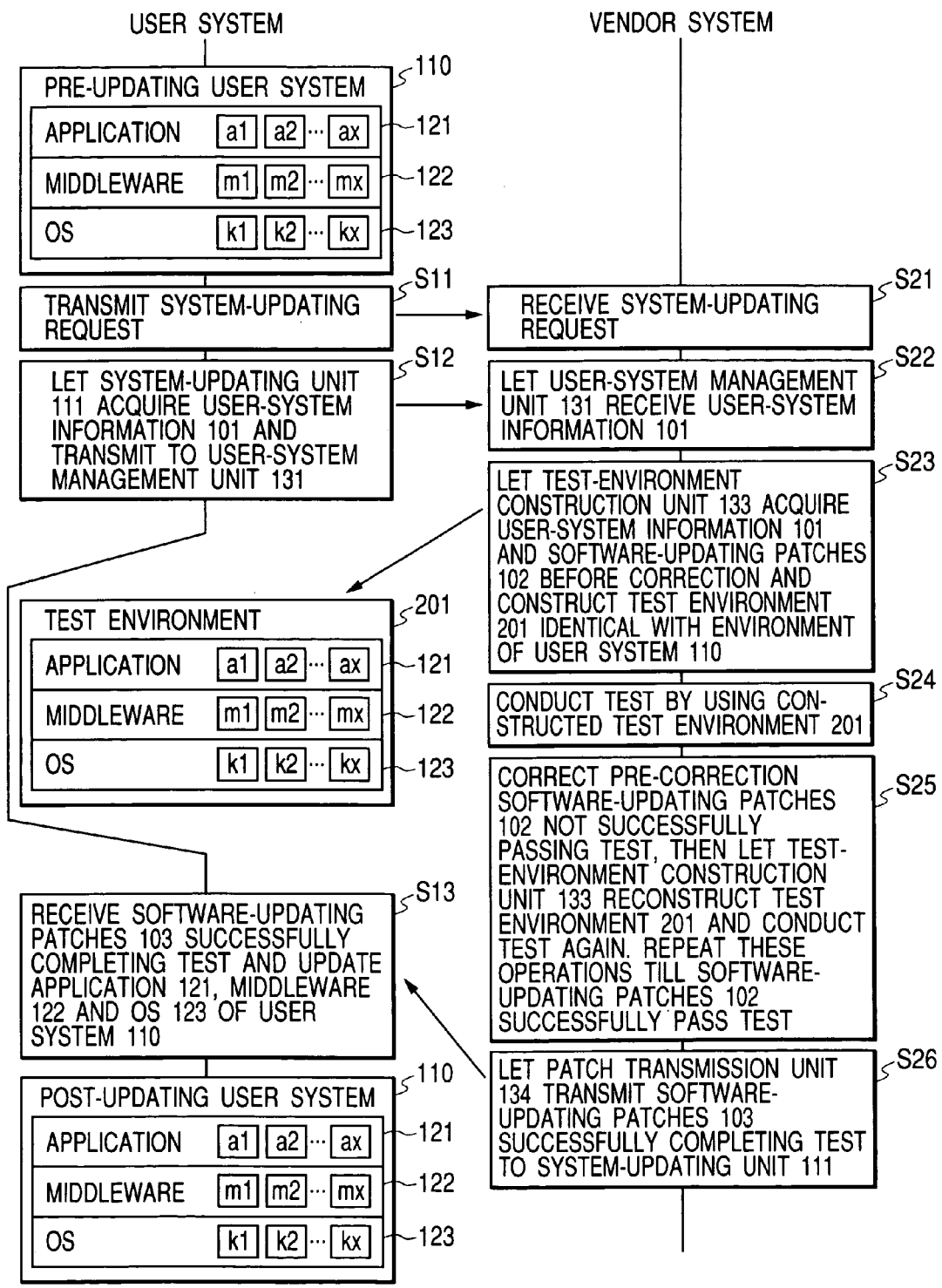
FIG. 2 shows a flowchart representing a sequence of operations of a schematic procedure for implementing the system-updating method according to the first embodiment of the present invention.
Figure 3:
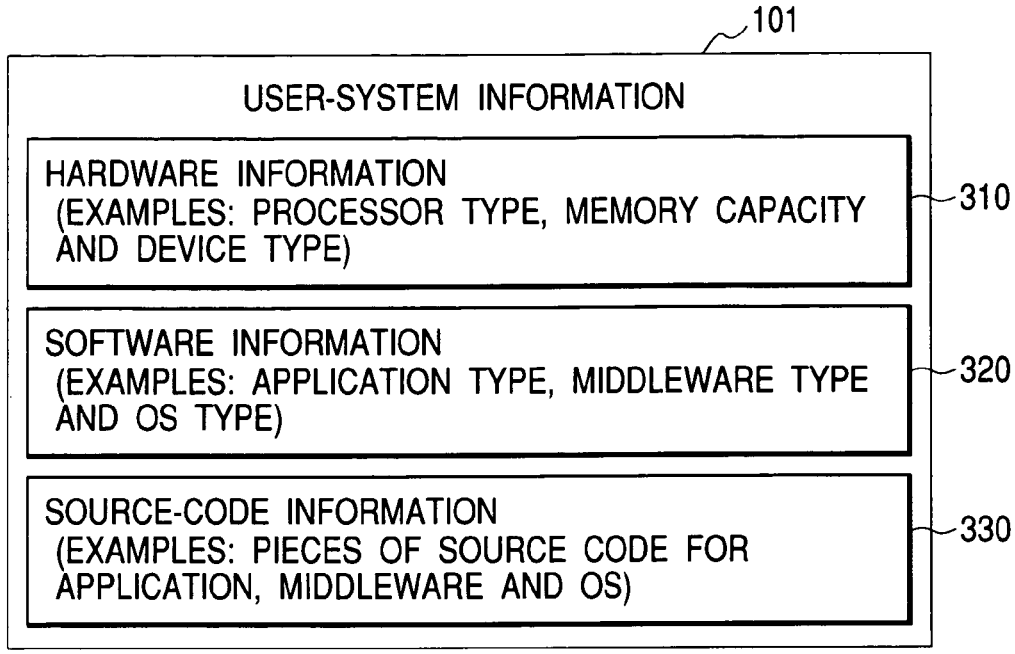
FIG. 3 is a diagram showing typical information on a user system.
Figure 4:
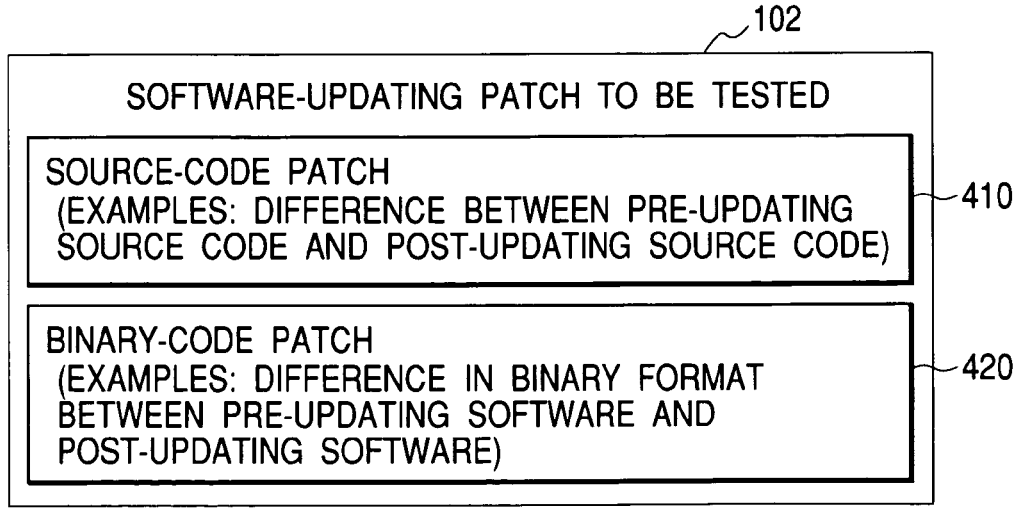
FIG. 4 is a diagram showing typical software-updating patches to be tested.
Figure 5:
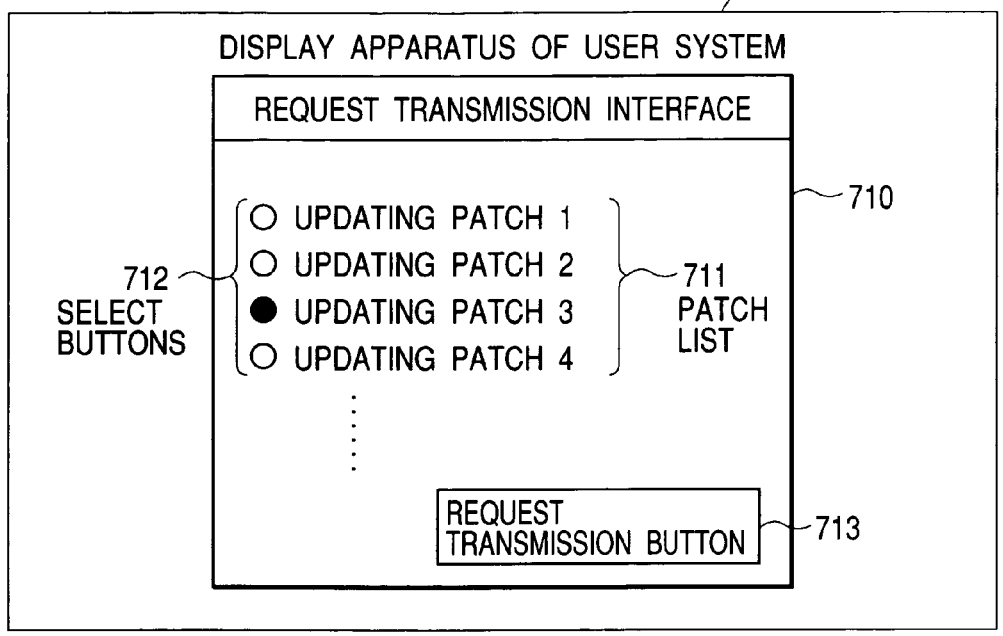
FIG. 5 is a diagram showing a model of a screen appearing on a display apparatus of the user system as a screen for selecting a type of the software-updating patch.
Figure 6:
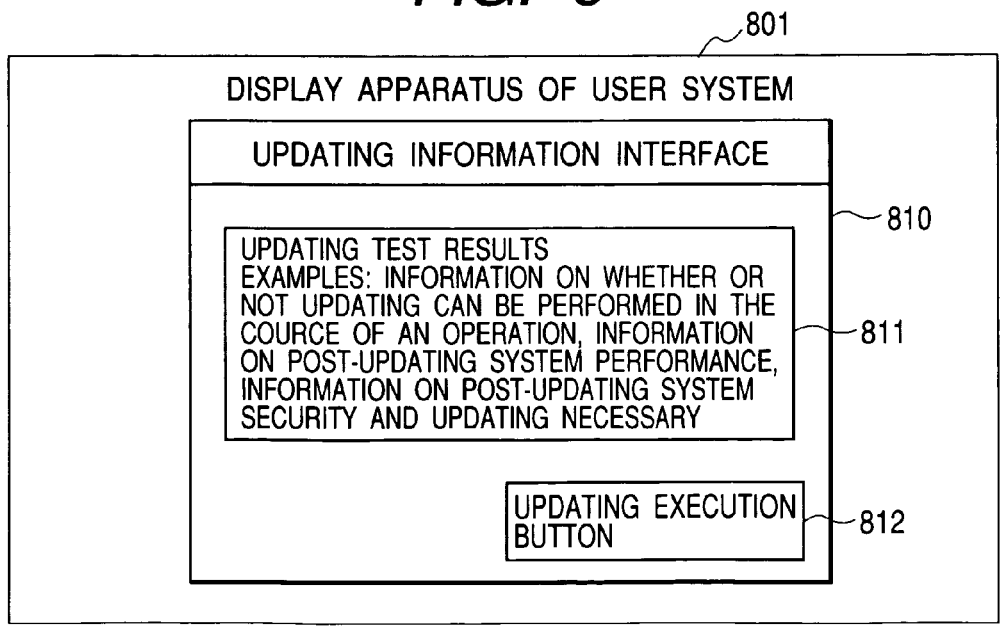
FIG. 6 is a diagram showing a model of a screen appearing on the display apparatus of the user system as a screen for confirming a result of an updating test and for executing an operation to update software.
Figure 7:
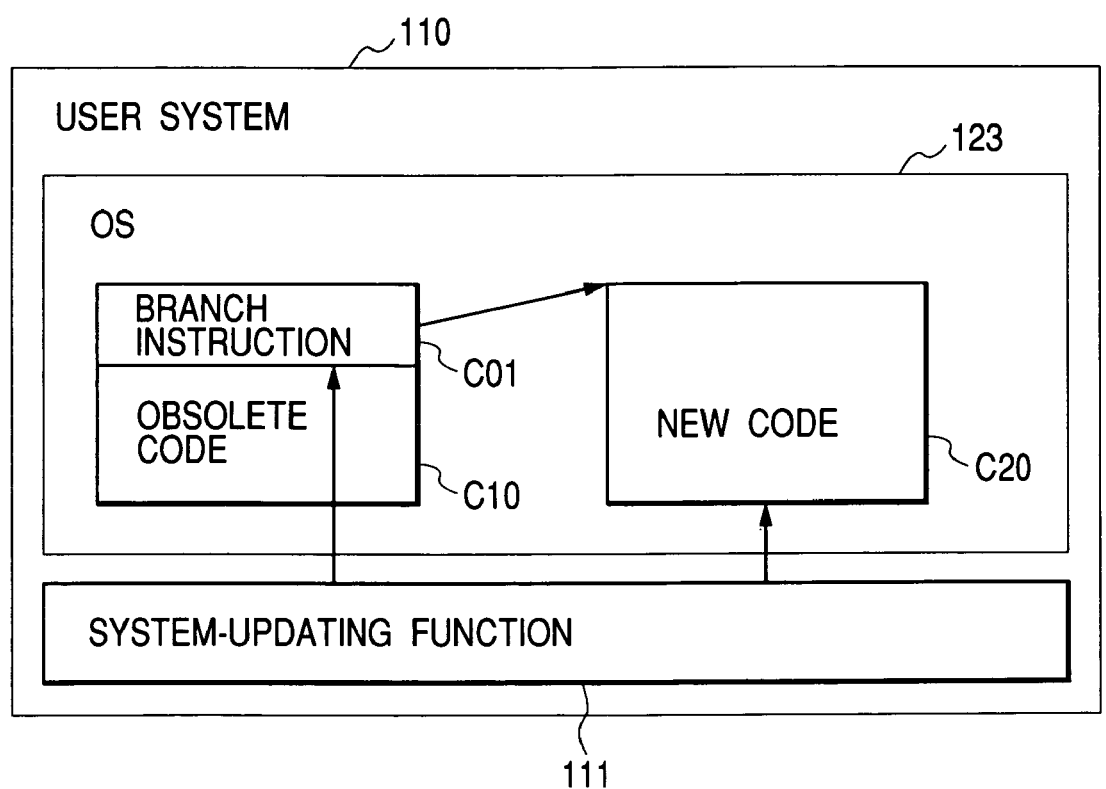
FIG. 7 is a diagram showing a system-updating configuration of the user system.

FIG. 2 shows a flowchart representing a sequence of operations of a procedure for implementing the system-updating method according to the first embodiment of the present invention. FIG. 3 is a diagram showing typical user-system information. FIG. 4 is a diagram showing typical software-updating patches to be tested. FIG. 5 is a diagram showing a model of a screen appearing on a display apparatus of the user system as a screen for selecting a type of the software-updating patch. FIG. 6 is a diagram showing a model of a screen appearing on the display apparatus of the user system as a screen for confirming a result of an updating test and for executing an operation to update software. FIG. 7 is a diagram showing a system-updating configuration of the user system 110.

The procedure of the system-updating method according to the first embodiment is explained by going through steps of the flowchart shown in FIG. 2 and referring to the other figures described above from time to time.

As shown in FIG. 2, the user system 110 has layers of the application 121, the middleware 122 and the OS 123. The application 121 includes pre-updating components a1, a2, . . . and ax. The middleware 122 includes pre-updating components m1, m2, . . . and mx. The OS 123 includes pre-updating components k1, k2, . . . and kx.

The components to be updated on each of the layers are replaced with software-updating patches 102 in the test environment 201. A post-updating component is denoted by a capital of the alphabet.

First of all, at a step S11, the user system 110 requests the vendor system 130 to update the user system 110. At a step S21, the vendor system 130 receives the request for a process to update the user system 110 from the user system 110.

When the user system 110 requests the vendor system 130 to update the user system 110 in the operation carried out at the step S11, the user system 110 typically displays a request transmission interface 710 like one shown in FIG. 5 on a display apparatus 701 of the user system 110 by using a browser. The request transmission interface 710 includes a list 711 of patches that can be used for updating the user system 110. The user selects a patch from the patch list 711 by checking a select button 712 associated with the selected patch. Then, the user operates a request transmission button 713 by clicking typically a mouse serving as a pointing device to transmit the request for a process to update the user system 110 to the vendor system 130.

Then, at a step S12, the system-updating unit 111 employed in the user system 110 acquires the user-system information 101 and transmits the acquired user-system information 101 to the user-system management unit 131 employed in the vendor system 130. As a method adopted by the system-updating unit 111 to acquire the user-system information 101, it is possible to use a method whereby an agent program is executed on the user system 110, monitoring the user system 110 all the time to detect a change made by the user. As an alternative, it is also possible to adopt a method whereby a user interface is provided to be used by the user itself as a means for providing the vendor system 130 with the user-system information 101. In addition, the operation of the step S12 is not necessarily carried out after the operation of the step S11. For example, the operation of the step S12 can also be carried out every time the user system 110 is updated.

As shown in FIG. 3, the user-system information 101 comprises hardware information 310, software information 320 and source-code information 330.

The hardware information 310 indicates the type of a processor employed in the user system 110, the storage capacity of a memory employed in the user system 110 as well as the types of a chipset and devices, which are also included in the user system 110.

On the other hand, the software information 320 indicates the types of components such as the application 121, the middleware 122 and OS 123, which have been installed in the user system 110.

The source-code information 330 is pieces of source code for the application 121, the middleware 122 and the OS 123 and information related to them. In this embodiment, the source-code information 330 is deliberately included in the user-system information 101 to make the vendor system 130 aware of an application to an open system in which the source code is disclosed.

Then, at a step S22, the user-system management unit 131 employed in the vendor system 130 receives the user-system information 101 transmitted in the operation carried out at the step S12.

In an operation carried out at the next step S23, the user-system management unit 131 passes on the user-system information 101 received in the operation carried out at the step S22 to the test-environment construction unit 133 of the patch-testing unit 132 employed in the vendor system 130. The test-environment construction unit 133 then acquires a software-updating patch 102 required to update the user system 110 and constructs a test environment 201 identical with the environment of the user system 110.

In this embodiment, the vendor system 130 directly receives the user-system information 101 from the user system 110 as described above. However, a database for storing information on the user system 110 can also be constructed in advance, and the vendor system 130 can then retrieve the user-system information 101 from such a database.

The software-updating patch 102 to be tested is a patch selected by the user in the operation carried out at the step S11 from the patch list 711 shown in FIG. 5. The software-updating patch 102 to be tested is acquired by adoption of a method whereby the software-updating patch 102 is obtained from the user, the software-updating patch 102 is created by the vendor itself or the software-updating patch 102 is obtained from another organization such an open-source community or another individual. In accordance with an alternative method, the vendor prepares a patch database in advance so that the vendor is capable of obtaining a software-updating patch 102 to be tested every time such a software-updating patch 102 is required. The patch data base contains a plurality of software-updating patches so that the vendor is capable of obtaining a software-updating patch from the database every time the patch is required.

The software-updating patch 102 to be tested is a software-updating patch 102 including a source-code patch 410, a binary-code patch 420 or both.

The source-code patch 410 is a difference between the pre-updating source code of software serving as an object of a software-updating process and the post-updating source code obtained as a result of the software-updating process. On the other hand, the binary-code patch 420 is a difference in binary format between the pre-updating binary code of software serving as an object of the software-updating process and the post-updating binary code obtained as a result of the software-updating process. A software-updating patch 103 created as a patch successfully passing a verification test conducted on the software-updating patch 102 serving as an object of the test also has the same configuration as the software-updating patch 102.

It is to be noted that the operations and configuration of the test-environment construction unit 133 will be described later in detail.

Then, at a step S24, the software is updated by using the pre-correction software-updating patch 102, and a test for verifying the operation of the user system 110 is carried out in the test environment 201 constructed as an environment identical with the environment of the user system 110.

Subsequently, at the next step S25, the software-updating patch 102 serving as the object of the verification test ending in a failure is corrected on the basis of a verification-test result obtained from the operation carried out at the step S24. The test-environment construction unit 133 then constructs a verification-test environment and again carries out a verification test by using the corrected software-updating patch 102 serving as a new object of the verification test in place of the pre-correction software-updating patch 102, which did not pass the test successfully. The operations of the steps S24 and S25 are carried out repeatedly till the verification test becomes successful.

There is also a method whereby a result of the verification test carried out in the operation performed at the step S24 is reported to the user in the operation carried out at the step S25 in order to issue an inquiry about whether or not to accept the updating to the user.

For example, an updating-information display interface 810 like one shown in FIG. 6 is prepared on the display apparatus 801 of the user system 110 by using a browser or the like and used for displaying updating-test-result information 811 obtained as a result of the verification test carried out at the step S24. The user can regard the verification test as a successful test by clicking an updating-execution button 812.

At a step S26, the patch transmission unit 134 employed in the vendor system 130 transmits the software-updating patch 103 successfully passing the verification test conducted at the step S25 to the system-updating unit 111 employed in the user system 110.

At a step S13, the user system 110 receives the software-updating patch 103 successfully passing the verification test from the vendor system 130. To be more specific, the system-updating unit 111 accepts the software-updating patch 103 successfully passing the verification test, applying the software-updating patch 103 to the application 121, the middleware 122 and the OS 123, which are included in the user system 110, for updating the user system 110.

In the typical flowchart shown in the figure, the component m1 of the middleware 122 is updated to a component M1 and the component k2 of the OS 123 is updated to a component K2.

In dependence on the condition of the user system 110, the user system 110 may be restarted after the updating process, or the software may be updated without restarting programs and operating system of the user system 110.

In the typical system-updating configuration shown in FIG. 7, for example, the system-updating unit 111 updates the software without restarting the OS 123. Obsolete code C10 shown in FIG. 7 is binary code of the OS 123 running on the user system 110. On the other hand, new code C20 is a binary-code patch 420 included in the software-updating patch 103 successfully passing the verification test or binary code obtained as a result of a process carried out by the system-updating unit 111 to compile a source-code patch 410. The system-updating unit 111 inserts the new code C20 into the OS 123 and a branch instruction C01 into a location immediately preceding the obsolete code C10 in order to update the OS 123.

Figure 8:
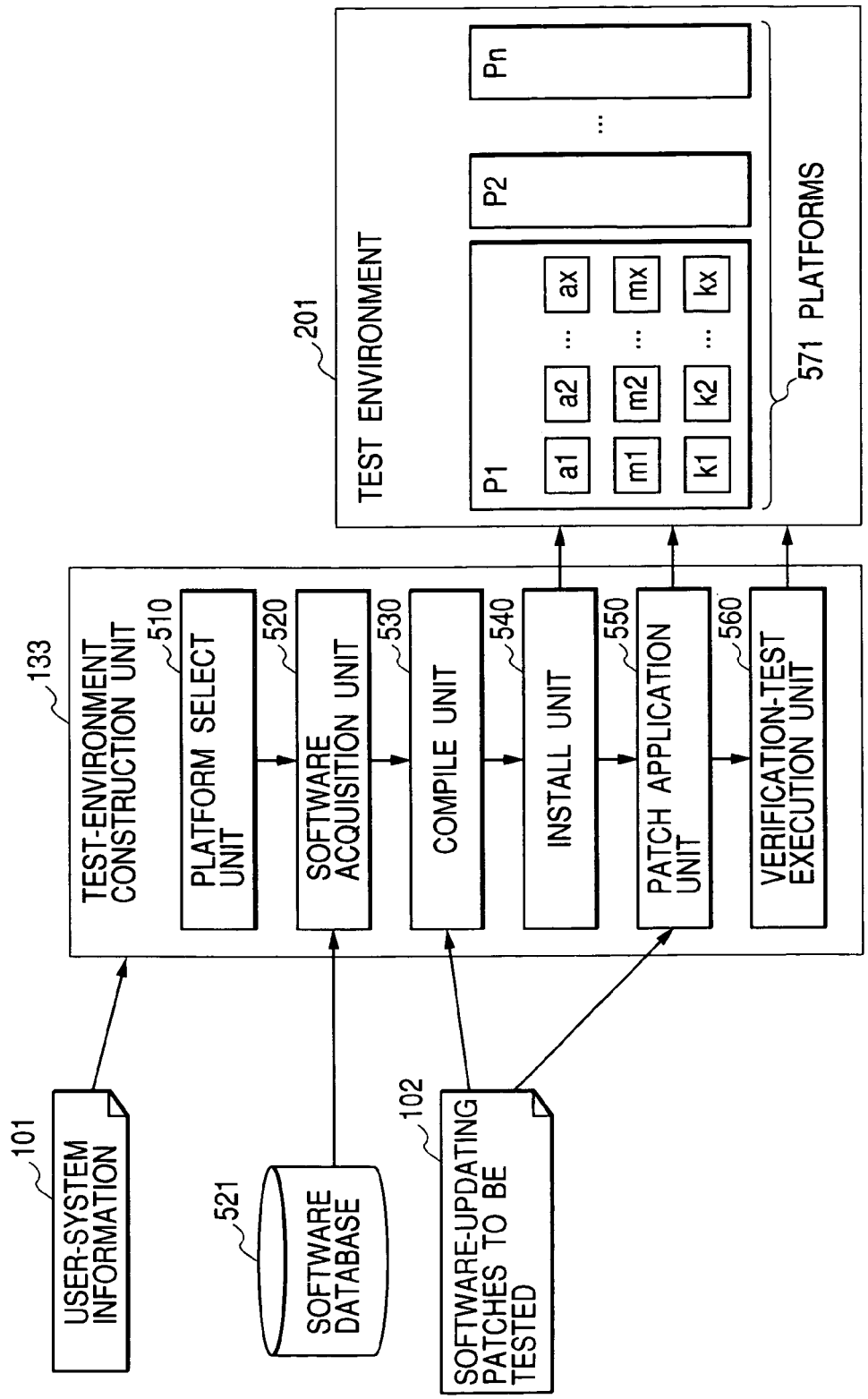
FIG. 8 is a block diagram showing the configuration of a test-environment construction unit 133.
Figure 9:
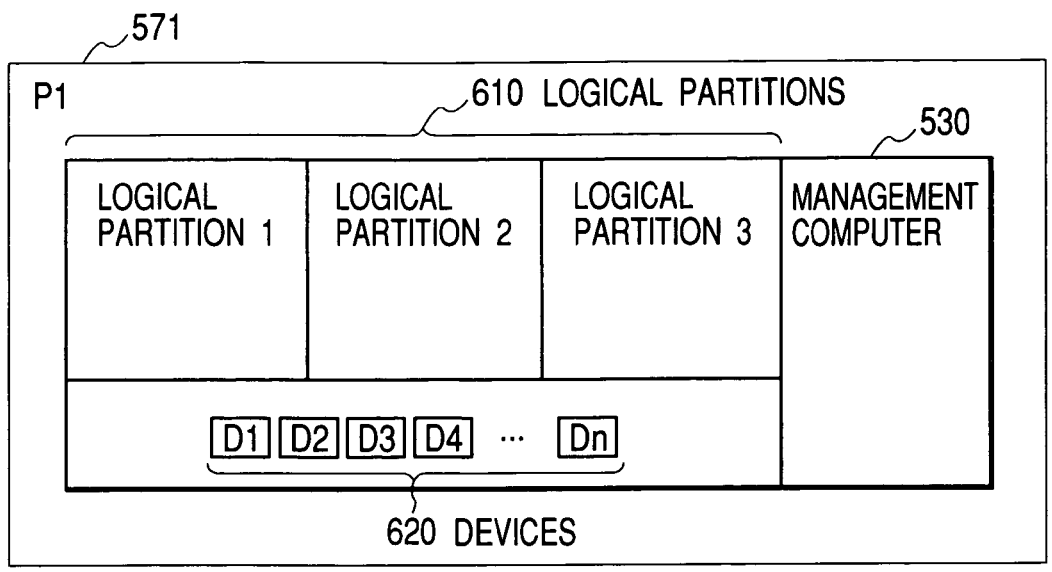
FIG. 9 is a diagram showing a model of a typical configuration of a test environment 201.

Next, the test-environment construction unit 133 is explained in detail by referring to FIGS. 8 to 15. FIG. 8 is a block diagram showing the configuration of the test-environment construction unit 133. FIG. 9 is a diagram showing a model of a typical configuration of the test environment 201. FIGS. 10 to 15 each show a flowchart representing operations carried out by a component employed in the test-environment construction unit 133.

Used for constructing a test environment 201, the test-environment construction unit 133 comprises a platform select unit 510, a software acquisition unit 520, a compile unit 530, a install unit 540, a patch application unit 550 and a verification-test execution unit 560 as shown in FIG. 8.

The test environment 201 has a plurality of platforms 571 having hardware configurations different from each other. Each of the platforms P1, P2 . . . and Pn includes application components a1, a2, . . . and ax, middleware components m1, m2, . . . and mx as well as OS components k1, k2, . . . and kx.

In addition to the method to construct a test environment 201 by actually preparing different hardware environments in advance for the test environment 201 as described above, there is also a method by which the real machine of a platform 571 is logically divided into a plurality of logical computers (or logical partitions) 610 as shown in FIG. 9 and one of the logical partitions 610 is assigned to the test environment 201 being created. In this case, a management computer 630 is used as a computer for setting the number of CPUs employed in a logical partition 610, the operating frequency of each of the CPUs and the size of a memory employed in a logical partition 610 as well as selecting a device 620 to be connected to a logical partition 610.

The test-environment construction unit 133 executes a procedure described below to acquire user-system information 101 from the user system 110, construct a test environment 201 identical to the environment of the user system 110 on the basis of the user-system information 101 and execute a verification test by using the constructed test environment 201.

Figure 10:
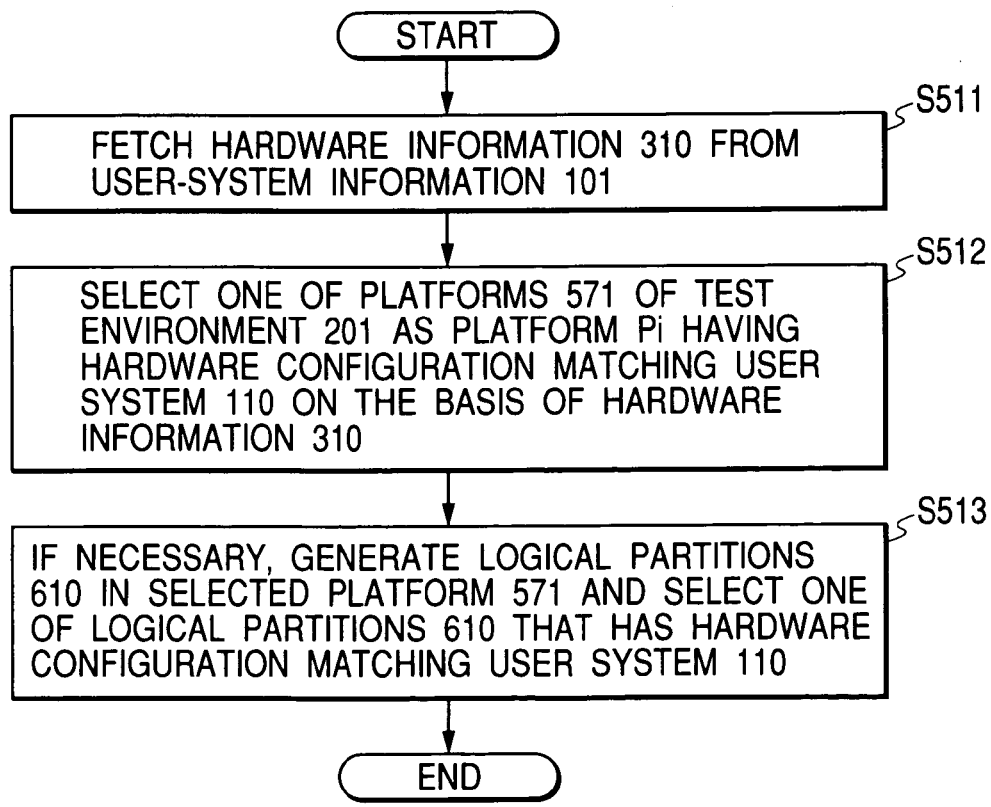
FIG. 10 shows a flowchart representing operations carried out by a platform select unit 510 employed in the test-environment construction unit 133.

First of all, at a step S511 of the flowchart shown in FIG. 10, the platform select unit 510 acquires hardware information 310 from the user-system information 101. Then, at the next step S512, the platform select unit 510 selects one of the platforms 571 as a platform having a hardware configuration identical with the user system 110 on the basis of the hardware information 310. Subsequently, at the next step S513, if necessary, the platform select unit 510 generates logical partitions 610 in the selected platform 571. In addition, the number of CPUs employed in a specific one of the logical partitions 610, the operating frequency of each of the CPUs and the size of a memory employed in the specific logical partition 610 are set whereas a device 620 to be connected to the specific logical partition 610 is selected so that the hardware configuration of the specific logical partition 610 matches the user system 110.

If it is difficult for the vendor to obtain a platform 571 having a hardware configuration equivalent to the user system 110, it is also possible to adopt a method of constructing a pseudo platform 571 by simulation using software. Instead of using a specific logical partition 610 in a selected platform 571 as described above, a real machine can also be used. In addition, it is also possible to adopt another method whereby the vendor prepares a plurality of computers as well as a plurality of devices in advance and, if a test environment 201 needs to be constructed, one of the computers and one of the devices are used as a platform 571 for the test environment 201 or the computers and the devices can be used for other applications in a case where a test environment 201 is not required.

Figure 11:
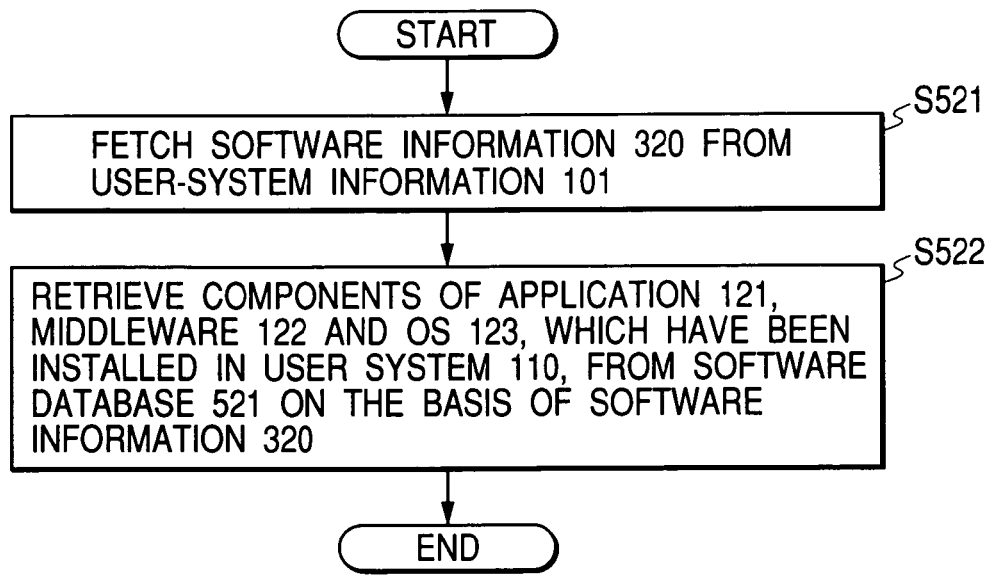
FIG. 11 shows a flowchart representing operations carried out by a software acquisition unit 520 employed in the test-environment construction unit 133.

Next, at a step S521 of the flowchart shown in FIG. 11, the software acquisition unit 520 acquires software information 320 from the user-system information 101. Subsequently, at the next step S522, the software acquisition unit 520 retrieves components of the application 121, the middleware 122 and the OS 123, which have been installed in the user system 110, from the software database 521 on the basis of the software information 320. The software components retrieved from the software database 521 can be executable binary code or source code.

Figure 12:
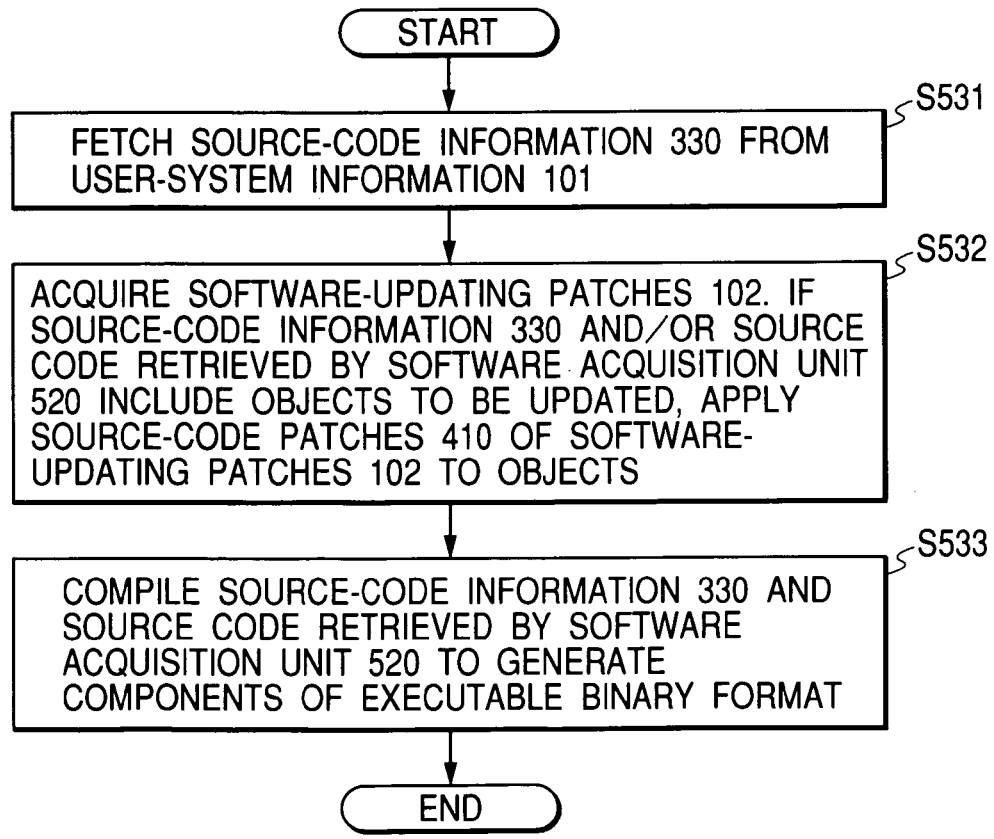
FIG. 12 shows a flowchart representing operations carried out by a compile unit 530 employed in the test-environment construction unit 133.

Next, at a step S531 of the flowchart shown in FIG. 12, the compile unit 530 acquires source-code information 330 from the user-system information 101. Then, at the next step S532, the compile unit 530 acquires software-updating patches 102 to be tested. If the source-code information 330 and/or the source code retrieved by the software acquisition unit 520 include objects to be updated, the compile unit 530 applies source-code patches 410 of the software-updating patches 102 to be tested to the objects. After applying the source-code patches 410, at the next step S533, the compile unit 530 compiles the source-code information 330 and the source code retrieved by the software acquisition unit 520 to generate components of an executable binary format.

The generated components are components of the application 121, the middleware 122 and the OS 123, which have been installed in the user system 110.

Figure 13:
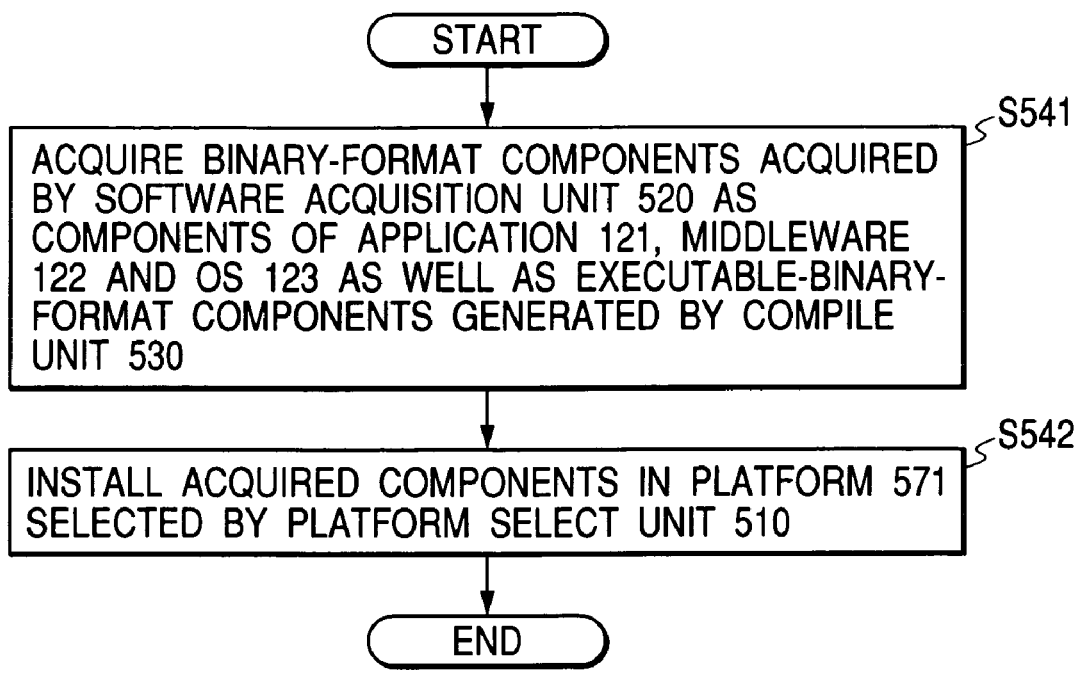
FIG. 13 shows a flowchart representing operations carried out by an install unit 540 employed in the test-environment construction unit 133.

Next, at a step S541 of the flowchart shown in FIG. 13, the install unit 540 obtains the binary-format components acquired by the software acquisition unit 520 as components of the application 121, the middleware 122 and the OS 123 as well as the binary-format components generated by the compile unit 530. Then, at the next step S542, the install unit 540 installs the obtained components in the platform 571 selected by the platform select unit 510.

Figure 14:
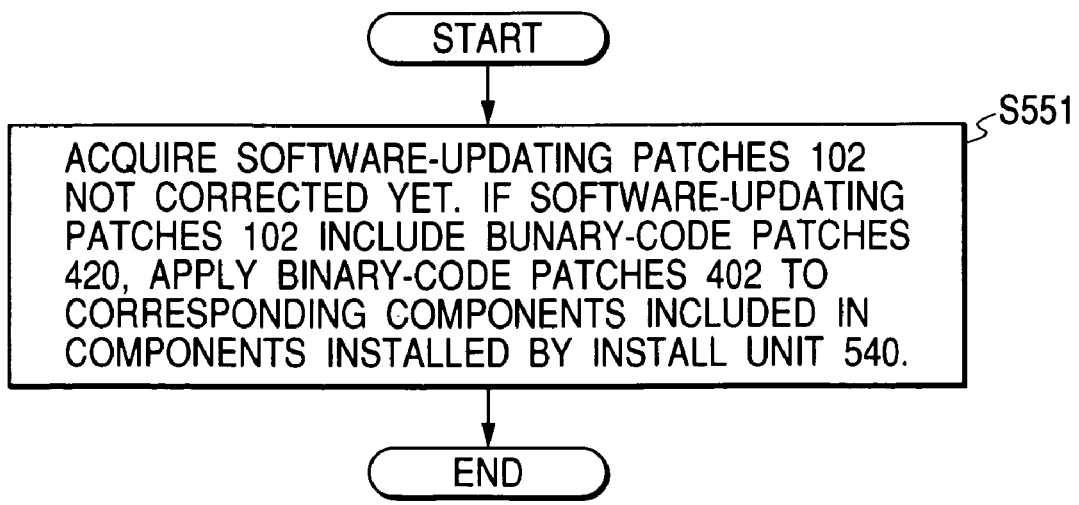
FIG. 14 shows a flowchart representing operations carried out by a patch application unit 550 employed in the test-environment construction unit 133.

Next, at a step S551 of the flowchart shown in FIG. 14, the patch application unit 550 acquires the software-updating patches 102 to be tested. If the software-updating patches 102 include binary-code patches 420, the patch application unit 550 applies the binary-code patches 402 to corresponding components included in the components installed by the install unit 540.

In accordance with the procedure explained so far, a test environment 201 has been constructed as an environment identical with that of the user system 110.

Figure 15:
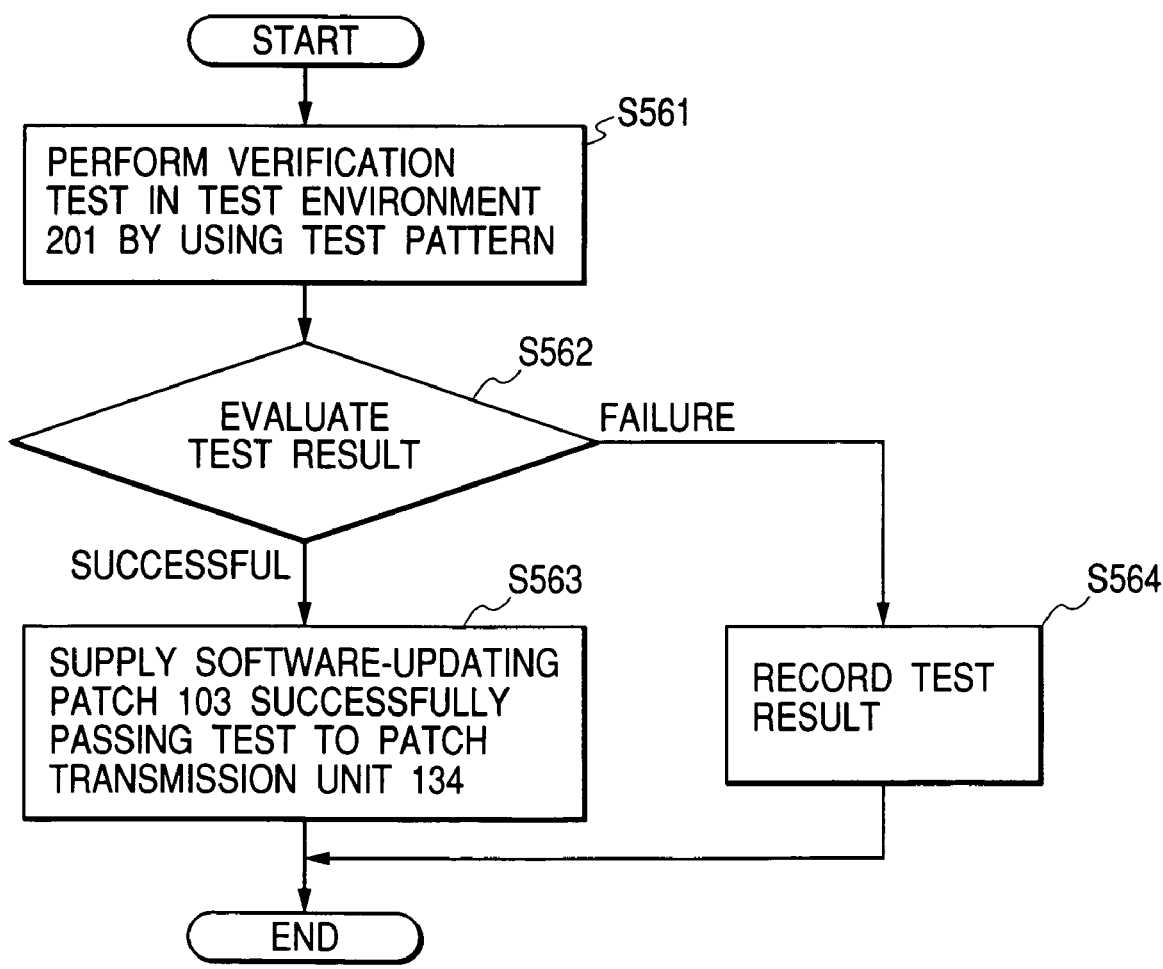
FIG. 15 shows a flowchart representing operations carried out by a verification-test execution unit 560 employed in the test-environment construction unit 133.

Next, at a step S561 of the flowchart shown in FIG. 15, the verification-test execution unit 560 carries out a verification test in the test environment 201 by using a test pattern. The test pattern may be a required test pattern acquired from the user or a test pattern prepared by the vendor itself. Then, at the next step S562, the verification-test execution unit 560 evaluates a result of the verification test to determine whether or not the test has been ended successfully. If the verification test has been ended successfully, the flow of the procedure goes on to a step S563 at which the verification-test execution unit 560 supplies the software-updating patch 103 successfully passing the test to the patch transmission unit 134. If the verification test has been ended in a failure, on the other hand, the flow of the procedure goes on to a step S564 at which the verification-test execution unit 560 records the result of the test. Examples of the failure of the verification test include a system crush occurring in the course of the test and a failure to achieve a function set as a target.

Then, another software-updating patch 102 is selected by examining the recorded result of the verification and used in re-execution of the procedures explained above. The procedures are carried out repeatedly till the verification test is ended successfully.

Second Embodiment

Figure 16:
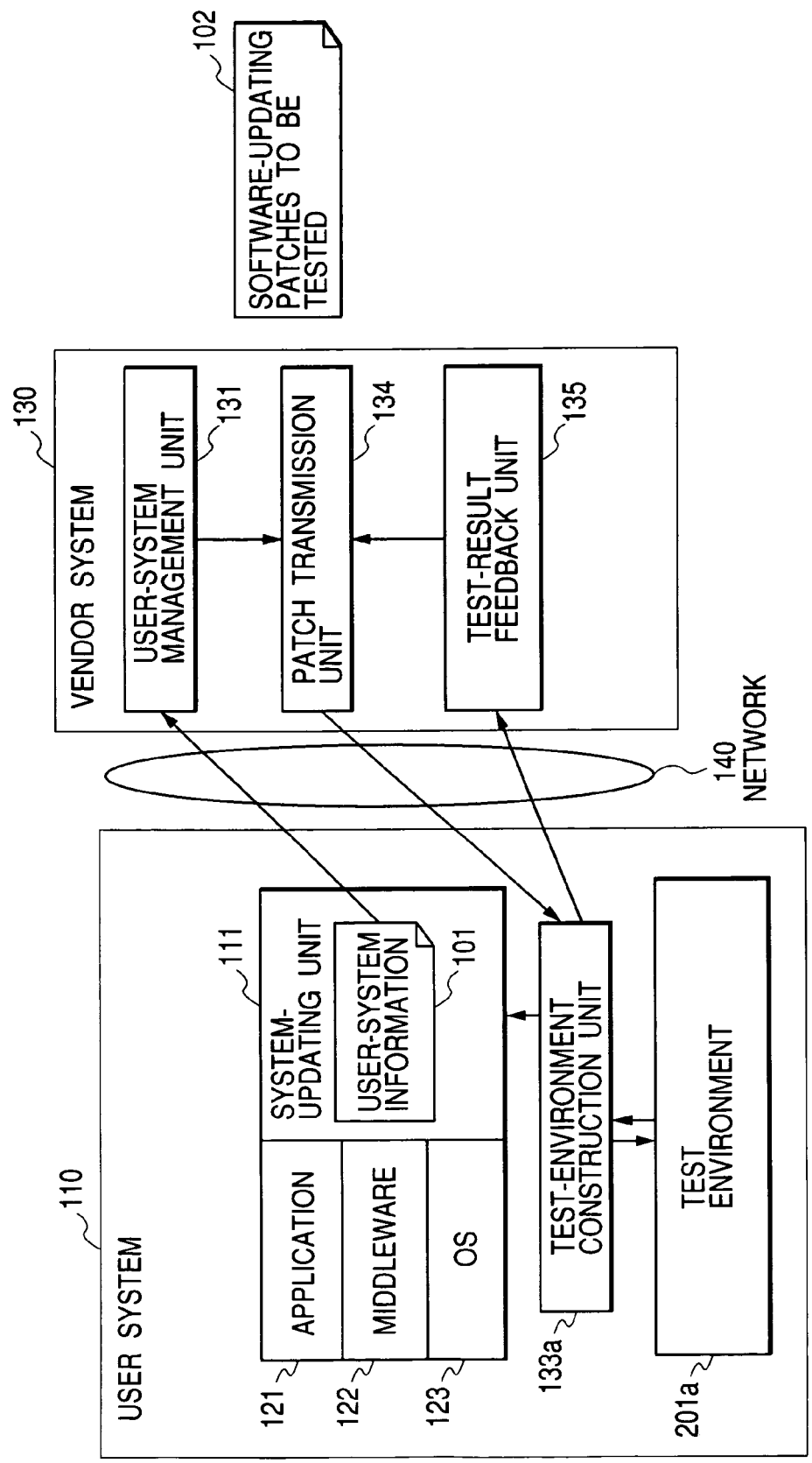
FIG. 16 is a diagram showing the configuration of a system for implementing a system-updating method according to a second embodiment of the present invention.

A second embodiment of the present invention is explained by referring to FIG. 16 below. FIG. 16 is a diagram showing the configuration of a system for implementing a system-updating method according to the second embodiment of the present invention.

In the case of the first embodiment, the test-environment construction unit 133 employed in the vendor system 130 constructs a test environment, and verifies the user system 110 in the test environment in the vendor system 130.

In the case of this embodiment, on the other hand, a test environment is constructed in the user system 110 on the basis of software-updating patches 102 received from the vendor system 130 as patches to be tested.

The user system 110 implemented by this embodiment comprises an application 121, a middleware 122, an OS 123, a system-updating unit 111, a test-environment construction unit 133a and a test environment 201a. The application 121, the middleware 122, the OS 123 and the system-updating unit 111 have the same configurations as their respective counterparts employed in the first embodiment.

On the other hand, the vendor system 130 comprises a user-system management unit 131, a patch transmission unit 134 and a test-result feedback unit 135. The platform of the test environment 201a is created in the user system 110 by preparing logical partitions obtained as a result of logical division of a real machine other than the hardware environment used by the user and assigning one of the logical partitions to the test environment 201a. In this way, the hardware environment used by the user is not affected by execution of a verification test.

As described above, a test environment 201a is constructed in the user system 110. The user system 110 also transmits user-system information 101 to the vendor system 130. As an alternative, the user-system information 101 may be stored in the vendor system 130 in advance.

When the vendor system 130 receives a request to update the system from the user system 110, the patch transmission unit 134 employed in the vendor system 130 transmits software-updating patches 102 based on the user-system information 101 as patches to be tested to the user system 110.

The test-environment construction unit 133a employed in the user system 110 constructs a test environment 201a on the basis of the user-system information 101 and the software-updating patches 102 to be tested.

If a verification test is ended successfully, the system-updating unit 111 updates the user system 110 on the basis of the software-updating patches 102 successfully passing the test. If the verification test is ended in a failure, on the other hand, the user system 110 notifies the test-result feedback unit 135 employed in the vendor system 130 that the verification test has been ended in a failure. In this case, the test-result feedback unit 135 retransmits another software-updating patch 102 as a candidate for the object to be tested.

What is claimed is:

1. A computer-implemented system-updating method for updating software installed in a user computer system, said method comprising the steps of:
   acquiring user computer system information including information on hardware employed in said user computer system and information on said software installed in said user computer system;
   constructing a test environment for testing operations of said user computer system based on said acquired user computer system information;
   updating said software in said test environment by using a software-updating patch;
   determining whether or not said operations of said user computer system are carried out normally by execution of said updated software in said test environment;
   supplying said software-updating patch to said user computer system; and
   inserting a code of said software-updating patch into an operating system (OS) running on said user computer system, and inserting a branch code into an obsolete code of said OS in order to branch to said code of said software-updating patch.

2. The system-updating method according to claim 1,
   wherein said software-updating patch includes a source-code patch,
   wherein said step of supplying includes sending a compiled code of said source-code patch to said user computer system, and
   wherein said code of said software-updating patch includes said compiled code.

3. The system-updating method according to claim 1,
   wherein said test environment is a logical partition, and
   wherein said step of constructing includes generating said logical partition, which is identical with said user computer system, based on hardware information of said user computer system information.

4. A vendor computer system having a first processor for providing software to a user computer system having a second processor, said vendor computer system comprising:
   a means for acquiring user computer system information including information on hardware employed in said user computer system and information on said software installed in said user computer system;
   a means for constructing a test environment for testing operations of said user computer system based on said acquired user computer system information;
   a means for updating said software in said test environment by using a software-updating patch;
   a means for determining whether or not said operations of said user computer system are carried out normally by execution of said updated software in said test environment;
   a means for supplying said software-updating patch to said user computer system if said operations of said user computer system are determining to be normal,
   wherein said user computer system comprises:
      a means for transmitting information on said user computer system to said vendor computer system;
      a means for receiving a code of a software-updating patch from said vendor computer system; and
      a means for inserting a code of said software-updating patch into an operating system (OS) running on said user computer system, and inserting branch code into an obsolete code of said OS in order to branch to said code of said software-updating patch.

5. The vendor computer system according to claim 4, further comprising:
   a means for compiling said source-code patch,
   wherein said software-updating patch includes a source-code patch,
   wherein said means for supplying sends a compiled code of said source-code patch to said user computer system,
   wherein said means for receiving receives said compiled code, and
   wherein said code of said software-updating patch includes said compiled code.

6. The vendor computer system according to claim 4, further comprising:
   a means for logically dividing a real machine of said vendor computer system into a plurality of logical partitions; and
   a means for generating said test environment, which is identical with said user computer system, based on hardware information of said user computer system information for one of said logical partitions.

7. A user computer system having a first processor for receiving software from a vendor computer system having a second processor, said vendor computer system comprising a means for supplying a software-updating patch which is retrieved from a patch database to said user computer system, and said user computer system comprising:
   a means for constructing a test environment for testing operations of said user computer system based on user computer system information including information on hardware employed in said user computer system and information an said software installed in said user computer system;
   a means for updating said software in said test environment by using said software-updating patch;
   a means for determining whether or not said operations of said user computer system are carried out normally by execution of said updated software in said test environment; and
   a means for inserting a code of said software-updating patch into an operating system (OS) running on said user computer system, and inserting branch code into an obsolete code of said OS in order to branch to said code of said software-updating patch if said operations of said user computer system are determining to be normal.

8. The user computer system according to claim 7, further comprising:
   a means for compiling said source-code patch,
   wherein said software-updating patch includes a source-code patch, and
   wherein said code of said software-updating patch includes said compiled code.

9. The user computer system according to claim 7, further comprising:
   a means for logically dividing a real machine of said user computer system into a plurality of logical partitions; and
   a means for generating said test environment which is identical with said user computer system based on hardware information of said user computer system information for one of said logical partitions.

* * * * *